3,292,307
METHOD OF SPOT SEEDING
Charles O. Finn, Cincinnati, Ohio, assignor to The Finn Equipment Company, Cincinnati, Ohio, a corporation of Ohio
No Drawing. Filed Nov. 6, 1963, Ser. No. 321,814
3 Claims. (Cl. 47—58)

The present invention is directed to a method of spot-plating seed in such a manner as to effectively provide for reforestation including reforestation of eroded lands and/or to establish turf and reforestation on low nutrient soils.

An object of the invention is to provide simple yet highly efficient and effective means for continuously and automatically converting a projected stream constituting an aqueous suspension containing a high solids content into a plurality of discrete or individual globular masses or wads, wherein each mass or wad may contain a nurse-crop and permanent growth seeds, nutrients, and substances for inducing and sustaining germination of the seeds.

Another object of the invention is to provide discrete globular masses, or wads, as aforesaid, which include and are interspersed with comparatively short lengths of continuous filaments which serve to not only initially form but to thereafter maintain and preserve the identity of said individual masses or wads.

A further object of the invention is to provide individual globular masses or wads containing seeds, fertilizer and compost which are interlaced with connective filaments which effectively render such masses and wads substantially immune to attack by rodents, birds and reptiles.

Still another object of the invention is to provide a method of providing globular masses or wads, of seeds, fertilizer, mulch, compost and connective filaments wherein the mulch provides moisture for effecting germination of the seed and wherein the connective filaments reinforce and hold the seeds, mulch, fertilizer and compost as a well-defined discrete self-sustaining mass.

Heretofore reforestation has been effected by planting seedlings, the cost of which is conservatively estimated as $1.00 each. When such seedlings are planted on one foot centers, the cost for planting an acre is $43,000. In sharp contrast thereto ground may be seeded, according to the teachings of the present invention at costs of from $40.00 to $50.00 per acre.

The method of the present invention enables tree, bush and/or vine seeds to be effectively planted alone or in conjunction with a nurse-crop seed, such as by way of example, rye grass, which because of its quick growth characteristics will rapidly germinate, take root and provide shade, moisture and nutrient for an entire growing season for the permanent-growth seeds which are also included in the original wad or mass containing the nurse-crop seed. The inherent characteristics of rye grass, by way of example, are such that it will die out after the first year by which time the permanent growth seeds will have had an opportunity to germinate and establish a root growth.

The subject method is ideally suited for effectively and inexpensively providing for the reforestation of strip mine areas and other eroded lands; and when salt-tolerant seeds are used, or if a salt-neutralizing agent is included, the present method may be utilized for effectively and inexpensively establishing vegetation along reclaimed lands, including seashores.

Those features of the invention which are believed to be new and novel are set forth in the appended claims and in the following description:

A pumpable, aqueous suspension containing a high solids content is prepared which in the preferred embodiment of the invention, contains an admixture of selected seeds, fertilizer, compost, cellulose wood fiber and lengths of filamentary material.

A suitable aqueous solution such as, by way of example, aforesaid, may then be expelled or discharged, under pressure, as a continuous stream, through a nozzle. After the stream is airborne and as it advances from the nozzle, it will disintegrate and break up into a plurality of individual globular masses or wads each of which contain all of the solid ingredients of the original aqueous suspension.

Uniformly satisfactory results have been obtained in those instances in which the filamentary material consists of fiber glass rovings ranging in length from ½ to 1½ inches, however, such lengths are not critical.

The following example is given solely by way of illustration and not by way of limitation or restriction, for illustrating the manner in which the teachings of the present invention may be utilized to seed one acre of ground with globular masses or wads on three foot centers:

Water _____ 250 gallons.
Fertilizer, commercial (5–10–10) _____ 50 pounds.
Compost, or similar plant organism _____ 25 pounds.
Wood, cellulose fiber _____ 50 pounds.
Chopped glass rovings _____ 20 pounds.
Nurse-crop and permanent growth
  seed _____ ⅛ to several
                                      pounds.[1]

[1] Depending upon the size and weight of the individual seeds and the amount of growth desired.

After the ingredients have been thoroughly intermixed to provide a uniform pumpable aqueous suspension having a high solids content, such suspension may be suitably pumped and expelled through a nozzle as a continuous stream. However, as said stream becomes airborne it will break up into individual globular masses or wads by reason of the velocity of the solution and the presence therein of the filamentary material with the result that the stream will literally disintegrate into a plurality of discrete, substantially uniform masses or wads each of which contain a proportionate amount of all of the individual ingredients of the original aqueous suspension. By a sweeping movement of the nozzle, it is a simple matter to uniformly distribute the entire aqueous suspension as individual globular masses or wads over the area to be seeded.

The physical characteristics of each mass or wad are such that they each contain sufficient moisture and nutrient to initially enable the permanent growth seeds and/or nurse seeds to germinate, even though such masses or wads may have fallen onto areas which normally would not be conducive to germination.

Solely to indicate the wide variety of seed products which may be utilized with my method, I submit the following list:

*Aronia arbutifolia*
*Calycanthus floridus*
*Campsis radicans* (Bignonia)
*Catalpa speciosa*
*Celastrus orbiculata*
*Cercis canadensis*
*Crataegus oxyacantha*
*Euonymus alatus*
*Gleditsia triacanthos*
*Ligustrum obtusifolium*
*Liquidambar styraciflua*
*Lonicera tatarica*
*Parthenocissus quinquefolia*

*Parthenocissus tricuspidata*
*Platanus orientalis*
*Prunus serotina*
*Robinia pseudoacacia*
*Rosa multiflora,* thornless rose
*Rosa rugosa*
*Symphoricarpus orbiculatus*
*Tilia cordata*
*Viburnum dentatum*
*Viburnum lantana*
Silver maple
Black locust
Pine
*Euonymus fortunei* (radicans)
*Koeloeuteria paniculata*
*Lonicera japonica*
*Rosa wichuriana*

From the foregoing it will be noted that I have thus provided a simple yet highly effective method for producing wads or individual masses each containing a nutrient, moisture agent, seed and means for literally tying the aforesaid ingredients together as a well defined mass or wad.

As used herein, substances such as wood pulp fibers, brans, and the like give bulk to and absorb and retain water to the slurry and the discrete masses or wads formed therefrom; the enumerated substances are merely representative of a group or a class of ingredients which may be classed as typical water absorbing components.

What is claimed is:

1. The method of spot planting which comprises thoroughly intermixing lengths of fiberglass rovings, cellulose fiber, plant seed, water and fertilizer materials, and discharging the same as an aqueous slurry with sufficient velocity to create airborne wads which subsequently are scattered on the ground.

2. A method as disclosed in claim 1, wherein the glass rovings range in length from ½ to 1½ inches.

3. The method of spot planting which comprises thoroughly intermixing lengths of fiberglass rovings with water, water absorbing and retaining components, plant seed, and plant growth promoting components; and discharging the same as an aqueous slurry with sufficient velocity to create airborne wads which subsequently are scattered on the ground.

References Cited by the Examiner

UNITED STATES PATENTS

| | | | |
|---|---|---|---|
| 2,687,363 | 8/1954 | Manning | 47—56 X |
| 2,878,617 | 3/1959 | Finn | 47—1 |

ABRAHAM G. STONE, *Primary Examiner.*

R. E. BAGWILL, *Assistant Examiner.*